Figure 2A:
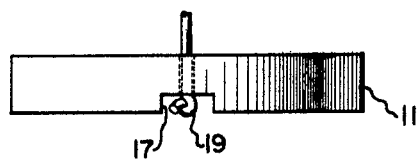

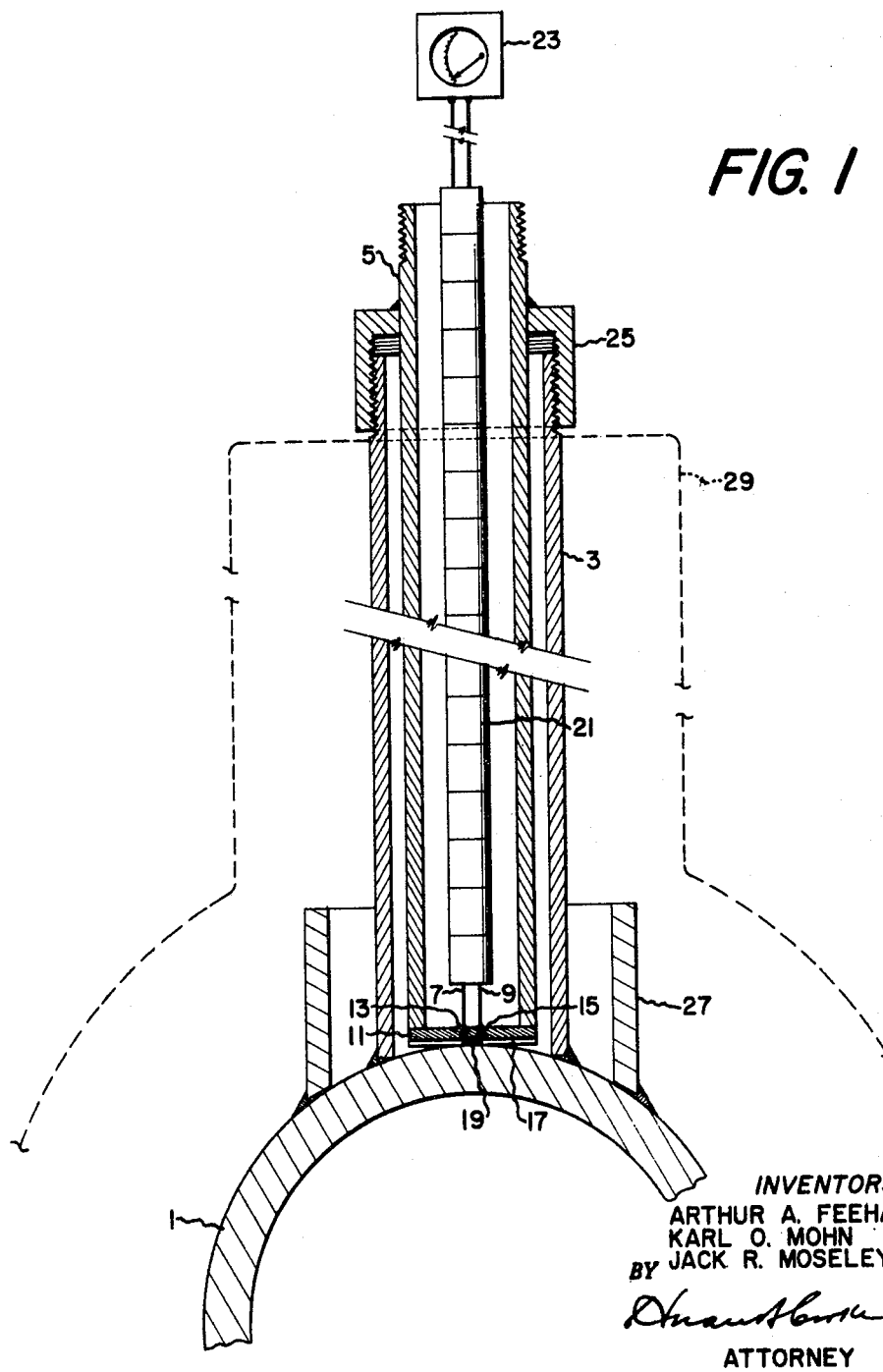

United States Patent Office 3,151,484
Patented Oct. 6, 1964

3,151,484
THERMOCOUPLE SUPPORT
Arthur A. Feehan and Karl O. Mohn, Port Arthur, and Jack R. Moseley, Groves, Tex., assignors to Gulf Oil Corporation, Pittsburgh, Pa., a corporation of Pennsylvania
Filed Feb. 3, 1961, Ser. No. 87,015
8 Claims. (Cl. 73—359)

This invention relates to a surface temperature measuring device and more particularly to a thermocouple device for measuring the skin temperature of a conduit through which a heated fluid is caused to flow.

It is frequently useful to determine the temperature of a heated fluid flowing through a conduit in order that a process step in which the heated fluid is utilized can be performed at maximum efficiency and/or in order to prevent overfiring of the heating apparatus in which the fluid is heated. The temperature most frequently used as an index for controlling process temperature or furnace temperature is the temperature of the fluid as it emerges from the furnace, that is, as it flows through the outlet of a conduit that is heated during passage through the combustion zone of a furnace or heater. Heaters involving this kind of structure find use in industry in the heating of liquids and gases preparatory to introduction into a chemical reaction or refining treatment. For example, such heaters are employed in the petroleum industry to heat petroleum hydrocarbons preparatory to cracking, hydrogenation, distillation, and/or other chemical reactions or processing operations.

Heretofore, in order to determine the temperature of a heated fluid flowing in a conduit within the required limits of accuracy, it has been the usual practice to measure the fluid temperature by means of a thermocouple sunk in a well extending a substantial distance into the interior of the conduit. However, the temperatures and gas stream velocities employed in some processing operations are so great that the thermowells become severely eroded in a relatively short time, whereby replacement is required. Frequent replacement of thermowells is disadvantageous not only from the standpoint of the cost of the parts and labor involved, but also for the reason that operation of the process at peak efficiency must be interrupted while the thermowell, the conduit in which it is mounted, and consequently the fluid in contact therewith, are permitted to cool to a temperature safe for handling.

Thermocouple devices for measuring exterior surface temperatures of conduits that do not require the normal thermowell structure have ben previously suggested, but previously proposed structures of this kind are not entirely satisfactory for accurately measuring the outlet temperature of a fluid as it emerges from the process heater or furnace. Thus, previously proposed, surface temperature measuring devices that are sensitive to relatively small temperature change normally cannot satisfactorily be employed in the corrosive atmosphere that exists within the combustion chamber of a process heater for substantial periods of time without damage to these devices. Under the corrosive conditions prevailing in the combustion chamber, the thickness or mass of the thermocouple junction would have to be so large to avoid frequent replacement that the thermocouple would be relatively insensitive to small temperature changes. In addition, thermocouples employed within a combustion chamber are apt to reflect temperature changes within the combustion zone more readily than changes in the temperature of a fluid within a conduit passing through the combustion chamber. Also, replacement of temperature measuring devices employed in the combustion zone of a furnace at normal operating temperatures is still difficult if not impossible. On the other hand, previously proposed surface temperature measuring devices are unsatisfactory to measure the surface temperature of a fluid conduit as it emerges from the heater, as such devices are relatively inaccurate in view of their sensitivity to external influences. Also, some previously proposed surface temperature devices for measuring surface temperatures have required handling of the hot conduit surface, as a result of which repair or replacement of the thermocouple device at normal operating temperatures is not possible. Thus, some surface temperature-measuring thermocouples have required deformation of the conduit surface in order to provide good contact between the thermocouple nad such surface, whereby replacement at normal operating temperatures is rendered difficult and the conduit itself is structurally weakened. Other surface temperature measuring devices have avoided deformation of the conduit surface, but at the sacrifice of firm contact between the thermocouple and the conduit surface, especially under adverse conditions, for example, as where the conduit is subject to vibration.

The present invention relates to a thermocouple device for accurately determining the temperature of a heated fluid within a conduit by measurement of the surface temperature of that conduit and that does not involve rapid wear or unusual difficulties as regards repair or replacement while maintaining optimum fluid temperatures, whereby greater efficiency can be achieved in the processing operation involved. It has now been found that an accurate indication of the temperature of a heated fluid flowing within a conduit can be obtained by surface temperature-measuring apparatus comprising a first tubular housing member attached at its base to the exterior surface of the conduit so as to enclose the particular area whose surface temperature is to be measured. The apparatus also includes a second thermocouple-protecting tubular member removably mounted within said first tubular member and spaced apart therefrom and enclosing a pair of insulated thermocouple lead wires. The second tubular member is closed at its inner end by a thermocouple support member that is provided with a pair of apertures through which extend said pair of thermocouple lead wires. Preferably, the thermocouple support member is also provided with a recess connecting said pair of apertures, said recess being of a size sufficient to accommodate the hot junction of a thermocouple. The depth of the recess is slightly less than the thickness of a thermocouple hot junction formed by the junction of the thermocouple lead wires positioned in said recess. The structure further includes means, such as a threaded collar, mounted on one of the first and second tubular members, preferably the latter, bearing nonresiliently on the other tubular member for firmly urging said thermocouple hot junction with variable force into contact with the conduit whose surface temperature is to be measured. The present invention includes the above-described apparatus and various subcombinations thereof.

Figure 2:
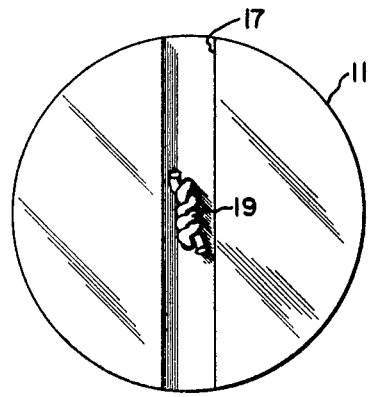
Figure 2B:
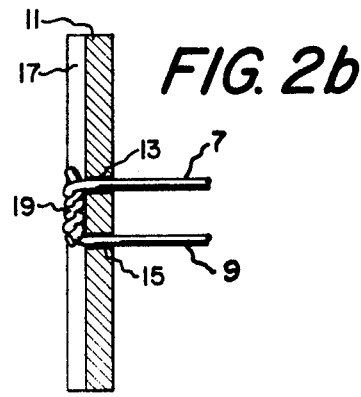
Figure 3:
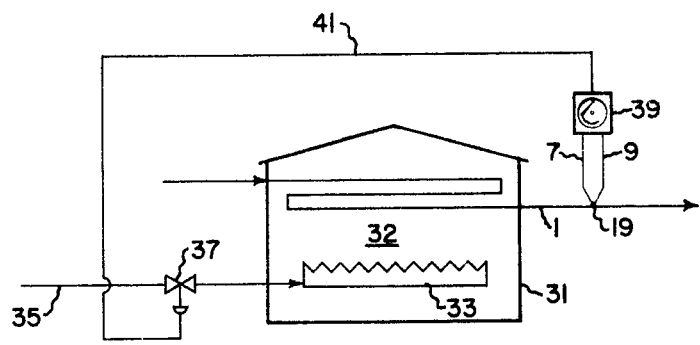

Referring now briefly to the drawings, in FIGURE 1 there is shown a side elevation, in section, of a preferred form of the thermocouple device of this invention. FIGURE 2 is a front elevation of a recessed thermocouple support member utilized in the device of FIGURE 1. FIGURES 2a and 2b, respectively, illustrate a plan view and a side elevation of the recessed thermocouple support member of FIGURE 2. FIGURE 3 is a schematic representation of a process heater embodying the thermocouple assembly of this invention and involving automatic heater temperature control. In all of the figures, like numerals refer to the same or similar elements of structure.

Referring in more detail to FIGURE 1, numeral 1 denotes a section of conduit forming the outlet to a process heater of the kind illustrated schematically in FIGURE 3, and through which flows the fluid whose temperature is to be determined and/or controlled. Numeral 3 denotes a first tubular housing member, seal-welded or otherwise fixedly attached at its base to the side of conduit 1 so as to enclose the area of the surface of conduit 1 whose temperature is to be measured. A second tubular thermocouple-protecting member 5 is spaced apart from and removably mounted within tubular housing member 3, and encloses a pair of insulated thermocouple leads 7 and 9. Tubular members 3 and 5 may be formed from ordinary steel or iron pipe, but are preferably formed from stainless steel or other metal having a relatively low thermal conductivity. In this manner, the possibility of inaccurate temperature readings resulting from the loss of heat from the conduit surface through the tubular members attached thereto is minimized.

Tubular members 3 and 5 are of sufficient length and member 3 is sufficiently well-insulated along the sides that the uninsulated, outer ends of the tubular members will remain at a relatively constant temperature, below 250° F. Under these conditions heat loss from the conduit surface through the tubular members 3 and 5 will be insufficient unduly to affect the temperature readings.

The tubular member 5 is closed at its inner end by a recessed, disc-shaped thermocouple support member 11. Support member 11 can also be formed from ordinary steel or iron but is preferably formed from stainless steel for the reasons indicated above. Alternatively, member 11 can be formed from a heat insulating material such as Transite (asbestos cement board), porcelain, silicon carbide, or the like, backed with stainless steel or the like if desired, in order further to minimize the loss of heat by conduction from the area contacted by the thermocouple hot junction and the inaccurate temperature readings resulting therefrom, but this is not absolutely necessary.

Thermocouple support member 11 is provided with a pair of openings or apertures 13 and 15 through which are passed, respectively, the thermocouple lead wires 7 and 9. Support member 11 is also provided with a recess 17 that connects openings 13 and 15, and in the embodiment illustrated in FIGURE 2, that also extends across the entire diameter of the support member. Recess 17 is of a size sufficient to accommodate a thermocouple hot junction 19, and functions in part to minimize the air space between the surface of conduit 1 and thermocouple support 11, whereby inaccurate temperature measurements resulting from loss of heat in the immediate area of the hot junction through contact with air are avoided. The depth of recess 17 is slightly less than the depth or thickness of the hot junction 19 so as to permit firm contact between the junction and the surface of conduit 1, but at the same time so as to protect the couple from breaking in the event that excessive force is applied thereto.

The thermocouple hot junction can be formed simply by twisting the ends of thermocouple lead wires 7 and 9 about each other for a short distance, but if desired they can be permanently fused by means of an electric arc or oxyacetylene gas flame. The nature of the thermocouple leads 7 and 9 that form the junction 19 will depend primarily upon the temperatures to be measured and the conditions under which they are to be used. Specific examples of common thermocouples and their usual operating temperature range are platinum-platinum rhodium (1300 to 2900° F.), Chromel-Alumel (0 to 2100° F.), and iron-constantan (0 to 1600° F.). Chromel-Alumel thermocouples perform best in oxidizing atmospheres. Iron-constantan thermocouples perform best in reducing atmospheres. Platinum-platinum rhodium, when suitably protected, can be used either in oxidizing or reducing atmospheres.

The thermocouple lead wires 7 and 9, suitably insulated, for example, by means of double-hole porcelain tubes 21 through which wires 7 and 9 are threaded, pass through tubular member 5 to an indicating device such as a millivolt meter, or potentiometer, 23 preferably calibrated in a selected temperature scale.

Threaded collar member 25, welded, or otherwise fixedly mounted on thermocouple protecting member 5, engages the correspondingly threaded outer end of tubular housing member 3 and forms means bearing on tubular member 3 for urging thermocouple protecting member 5, thermocouple support 11, and consequently, thermocouple hot junction 19 with variable force toward close contact with the surface of conduit 1.

Tubular thermocouple protecting member 5 is provided with threads at its outer end for engagement with a suitable, correspondingly threaded thermocouple adapter head, not shown.

Numeral 27 designates a third tubular member, welded or otherwise fixedly attached to the surface of conduit 1, and spaced apart from and enclosing the base of tubular housing member 3. Member 27 forms a support for that portion of a heat insulating material 29, such as fire-felt wool, mineral wool, felted or packed, rock cork, or the like, that encloses the base of tubular housing 3. Insulation support member 27 minimizes the possibility of inaccurate temperature readings resulting from local heat loss to air circulating in the space vacated by insulation that has separated from the surface of tubular member 3 and conduit 1 through the effect of heat and drying over a period of time.

To replace a worn-out or defective thermocouple, threaded collar 25 is simply unscrewed from tubular housing member 3, and the tubular thermocouple protecting member 5, together with the thermocouple assembly enclosed thereby is withdrawn from tubular housing 3. The thermocouple device is removed from tubular protecting member 5 by separating the junction 19 into its respective lead wires, unscrewing the thermocouple adapter head, not shown, from the threaded outer end of tubular protective member 5 and withdrawing the thermocouple. A new thermocouple can then be prepared by inserting new thermocouple lead wires through the holes in insulators 21, through openings 13 and 15, and forming a new, twisted junction 19 in slot 17 of thermocouple support member 11, and by replacing the thermocouple adapter head on the outer end of thermocouple protective member 5. The junction 19 is then firmly contacted with the surface of conduit 1 by inserting the entire assembly into the tubular housing member 3 and by screwing collar 25 onto the threaded end of tubular housing member 3.

In actual practice, it may be convenient to provide duplicate thermocouple assemblies so that a defective thermocouple can be replaced rapidly and without substantial interruption of the temperature-determining function. In either case, it will be noted that replacement of a worn-out thermocouple can be effectively accomplished without the necessity of lowering the temperature of the fluid flowing through conduit 1.

It will be appreciated that the surface temperatures measured by the herein-disclosed devices will be somewhat lower than the actual temperatures of the fluid within the conduit. However, so long as the temperature difference is constant and so long as the thermocouple device is sufficiently sensitive, as here, this is no handicap, as the temperatures indicated by the thermocouple can be easily corrected to compensate for the difference.

Although the invention can be used in systems involving manual control of temperature, it is readily adaptable for automatic control. Referring now to FIGURE 3, numeral 31 designates a heating apparatus or furnace provided with a combustion chamber 32, heated by burner element 33, into which a suitable fuel is introduced by way of supply line 35 and pneumatically controlled valve 37. Conduit 1, through which flows the fluid whose temperature is to be controlled, passes through tact with the conduit whose surface temperature is to be measured.

4. A thermocouple assembly for measuring the exterior surface temperature of a conduit comprising a first tubular housing member fixedly attached at its base to the exterior surface of said conduit so as to enclose the area whose surface temperature is to be measured, a second tubular member removably mounted within said first tubular housing member and spaced apart therefrom and enclosing a pair of insulated thermocouple lead wires, said second tubular thermocouple protecting member being closed at its inner end by a thermocouple hot junction support member, said support member being provided with a pair of openings through which said pair of thermocouple lead wires extend, said thermocouple support member also being provided with a recess connecting said pair of openings, said recess being of a size sufficient to accommodate the hot junction of a thermocouple, the depth of said recess being slightly less than the thickness of the hot junction, a thermocouple hot junction formed by the junction of said thermocouple lead wires adjacent the exterior surface of the thermocouple support member, means mounted on one of said first and second tubular members bearing nonresiliently on the other of said tubular members for urging said thermocouple hot junction with variable force into contact with the conduit whose surface temperature is to be measured.

5. A tubular thermocouple protecting member enclosing a pair of insulated thermocouple lead wires and closed at one end by a thermocouple hot junction support member, each of said thermocouple protecting member and said thermocouple support member being formed from a material having a relatively low thermal conductivity, said thermocouple support member being provided with a pair of openings through which extend said pair of thermocouple lead wires, said thermocouple support member also being provided with a recess connecting said pair of openings, said recess being of a size sufficient to accommodate the hot junction of a thermocouple, the depth of said recess being slightly less than the thickness of the hot junction, a thermocouple hot junction formed by the junction of said thermocouple lead wires positioned in said recess.

6. A thermocouple assembly for measuring the external surface temperature of a conduit forming the outlet of a heating apparatus through which the conduit passes, comprising a first tubular housing member fixedly attached at its base to the exterior surface of said conduit so as to enclose the area whose surface temperature is to be measured, a second tubular thermocouple protecting member removably mounted within said first tubular housing member and spaced apart therefrom and enclosing a pair of insulated thermocouple lead wires, said second tubular thermocouple protecting member being closed at its inner end by a thermocouple hot junction support member, said first and second tubular members being of a length such that their outer ends will be at a relatively low temperature convenient for handling, said first and second tubular members and said thermocouple support member being formed from a material having a relatively low thermal conductivity, said thermocouple support member being provided with a pair of openings through which extend said pair of thermocouple lead wires, said thermocouple support member also being provided with a recess connecting the pair of openings, said recess being of a size sufficient to accommodate the hot junction of a thermocouple, the depth of said recess being slightly less than the thickness of the hot junction, a thermocouple hot junction formed from the junction of said thermocouple lead wires positioned in said recess, temperature indicating means connected to the outer ends of the thermocouple lead wires, means mounted on one of said first and second tubular members bearing nonresiliently on the other of said members for urging said thermocouple hot junction into contact with variable force into contact with the conduit whose surface temperature is to be measured.

7. A thermocouple assembly for measuring the external surface temperature of a conduit forming the outlet of a heating apparatus through which the conduit passes, comprising a first tubular housing member fixedly attached at its base to the exterior surface of said conduit so as to enclose the area whose surface temperature is to be measured, a second tubular thermocouple protecting member removably mounted within said first tubular housing member and spaced apart therefrom and enclosing a pair of insulated thermocouple lead wires, said second tubular thermocouple protecting member being closed at its inner end by a thermocouple hot junction support member, said first and second tubular members being of a length such that their outer ends will be at a relatively low temperature convenient for handling, said first and second tubular members and said thermocouple support member being formed from a material having a relatively low thermal conductivity, said thermocouple support member being provided with a pair of openings through which extend said pair of thermocouple lead wires, said thermocouple support member also being provided with a recess connecting the pair of openings, said recess being of a size sufficient to accommodate the hot junction of a thermocouple, the depth of said recess being slightly less than the thickness of the hot junction, a thermocouple hot junction formed from the junction of said thermocouple lead wires positioned in said recess, temperature indicating means connected to the outer ends of the thermocouple lead wires, means mounted on one of said first and second tubular members bearing nonresiliently on the other of said members for urging said thermocouple hot junction with variable force into contact with the conduit whose surface temperature is to be measured, a third tubular member mounted on said conduit and spaced apart from and enclosing the base of said first tubular housing member, said third tubular member forming a support for heat insulating material maintained in said space in contact with the base of said first tubular member.

8. A thermocouple hot junction support member, said support member being provided with a pair of openings, a pair of thermocouple lead wires extending through said openings, said support member also being provided with a recess connecting said pair of openings, said recess being of a size sufficient to accommodate a thermocouple hot junction, the depth of said recess being slightly less than the thickness of said hot junction, and a thermocouple hot junction formed by the junction of said thermocouple lead wires adjacent the recessed surface of said support member.

References Cited in the file of this patent
UNITED STATES PATENTS

| | | |
|---|---|---|
| 2,048,680 | Bird et al. | July 28, 1936 |
| 2,048,681 | Davidson et al. | July 28, 1936 |
| 2,142,677 | Parker | Jan. 3, 1939 |
| 2,752,411 | Walter | June 26, 1956 |

FOREIGN PATENTS

| | | |
|---|---|---|
| 1,094,857 | France | Dec. 15, 1954 | the combustion zone 32 of furnace 31. A thermocouple 19 is contacted with the exterior surface of conduit 1 at the outlet of the furnace 31. The lead wires 7 and 9 of the thermocouple are connected to a suitable recorder-controller 39 which is adapted to furnish a pneumatic signal through line 41 to the pneumatic motor of valve 37. The magnitude of the pneumatic signal transmitted to the motor of valve 37 will be proportional to the changes in temperature of the heated fluid flowing through conduit 1. Thus, as the temperature of the fluid flowing through conduit 1 decreases below the desired level, the amount of fuel flowing to burner 33 will be increased by suitable adjustment of valve 37. Conversely, as the temperature of the heated fluid flowing through conduit 1 increases above the desired level, the flow of fuel to burner 33 is decreased by suitable adjustment of valve 37.

Referring again to FIGURE 1, in a specific embodiment involving the heating of a low boiling hydrocarbon feed stock to a cracking temperature of about 1500° F. for purposes of ethylene manufacture, a reliable indication of the temperature of the heated hydrocarbon feed stock flowing within a 4½ inch I.D. heater outlet tube is obtained by a skin temperature-indicating device comprising a Chromel-Alumel hot junction enclosed within a ½ inch I.D. 18–8 stainless steel pipe approximately 20 inches long, provided with a one-inch I.D. 18–8 stainless steel collar, seal-welded to it in such a location that it can be screwed down over the threaded end of an 18–8 stainless steel tubular housing member about 18 inches long that is seal-welded at its base to the surface of the 4½ inch outlet tube or transfer line, so as to enclose the area whose surface temperature is to be measured. A two-inch I.D. 18–8 stainless steel pipe, approximately one and one-half inches to two inches long, is welded to the four and one-half inch transfer line around the one-inch tubular thermocouple housing member, and acts as an insulation support. The lengths of the one-half inch I.D. and one-inch I.D. tubular stainless steel members are such that the one-inch stainless steel collar is sufficiently cool to be easily and safely handled with the bare hands when changing or repairing couples while the heater is in service.

A comparison of the herein-described system of temperature measurement with the previously used, standard thermowell system in the embodiment described above is given below:

| | Standard Thermowell | Present Invention |
| --- | --- | --- |
| Initial cost | $22.50 | $15.00 |
| Replacement cost | $7.50 + cost of thermocouple. | Cost of thermocouple. |
| Average life | 1 month | 3–6 months. |
| Man-hours required to replace. | <1 | <1. |
| Number crafts required to replace. | 2 | 1. |
| Comments on replacement. | Heater must be brought down to 1,000° F. to replace. | Replace while heater is in service. |
| Estimated error | ±3° F. @ 1500° F | ±5° F. @ 1360° F. |

It will be obvious to those skilled in the art that many variations of the herein-described embodiments can be resorted to without departing from the spirit or scope of the invention. Accordingly, only those limitations should be applied as are included by the appended claims.

We claim:
1. A thermocouple assembly for measuring the exterior surface temperature of a conduit comprising a first tubular housing member fixedly attached at its base to the exterior surface of said conduit so as to enclose the area whose surface temperature is to be measured, a second tubular thermocouple protecting member removably mounted within said first tubular housing member and spaced apart therefrom and enclosing a pair of insulated thermocouple lead wires, said second tubular member being closed at its inner end by a thermocouple hot junction support member, said first and second tubular members being of a length such that their outer ends will be at a relatively low temperature convenient for handling, said support member being provided with a pair of openings through which said pair of thermocouple lead wires extend, said thermocouple support member also being provided with a recess connecting said pair of openings, said recess being of a size sufficient to accommodate the hot junction of a thermocouple, the depth of said recess being slightly less than the thickness of the hot junction, a thermocouple hot junction formed by the junction of said thermocouple lead wires adjacent the exterior surface of the thermocouple support member, means mounted on one of said first and second tubular members bearing nonresiliently on the other of said tubular members for urging said thermocouple hot junction with variable force into contact with the conduit whose surface temperature is to be measured.

2. A thermocouple assembly for measuring the exterior surface temperature of a conduit comprising a first tubular housing member fixedly attached at its base to the exterior surface of said conduit so as to enclose the area whose surface temperature is to be measured, a second tubular thermocouple protecting member removably mounted within said first tubular housing member and spaced apart therefrom and enclosing a pair of insulated thermocouple lead wires, said second tubular member being closed at its inner end by a thermocouple hot junction support member, said support member being provided with a pair of openings through which said pair of thermocouple lead wires extend, said thermocouple support member also being provided with a recess connecting said pair of openings, said recess being of a size sufficient to accommodate the hot junction of a thermocouple, the depth of said recess being slightly less than the thickness of the hot junction, a thermocouple hot junction formed by the junction of said thermocouple lead wires adjacent the exterior surface of the thermocouple support member, means mounted on one of said first and second tubular members bearing nonresiliently on the other of said tubular members for urging said thermocouple hot junction with variable force into contact with the conduit whose surface temperature is to be measured, and a third tubular member mounted on said conduit and spaced apart from and enclosing the base of said first tubular housing member, said third tubular member forming a support for heat insulating material maintained in said space in contact with the base of said first tubular member.

3. A thermocouple assembly for measuring the exterior surface temperature of a conduit comprising a first tubular housing member fixedly attached at its base to the exterior surface of said conduit so as to enclose the area whose surface temperature is to be measured, a second tubular thermocouple protecting member removably mounted within said first tubular housing member and spaced apart therefrom and enclosing a pair of insulated thermocouple lead wires, said second tubular member being closed at its inner end by a thermocouple hot junction support member, said support member being provided with a pair of openings through which said pair of thermocouple lead wires extend, said thermocouple support member also being provided with a recess connecting said pair of openings, said recess being of a size sufficient to accommodate the hot junction of a thermocouple, the depth of said recess being slightly less than the thickness of the hot junction, a thermocouple hot junction formed by the junction of said thermocouple lead wires adjacent the exterior surface of the thermocouple support member, a collar mounted on the second tubular thermocouple protecting member, said collar member being provided with threads that engage corresponding threads on said first tubular housing member, said collar and threads forming means for urging said thermocouple hot junction with variable force into con-